(No Model.)
J. H. STRUGNELL.
HAND TRUCK.
No. 271,152. Patented Jan. 23, 1883.
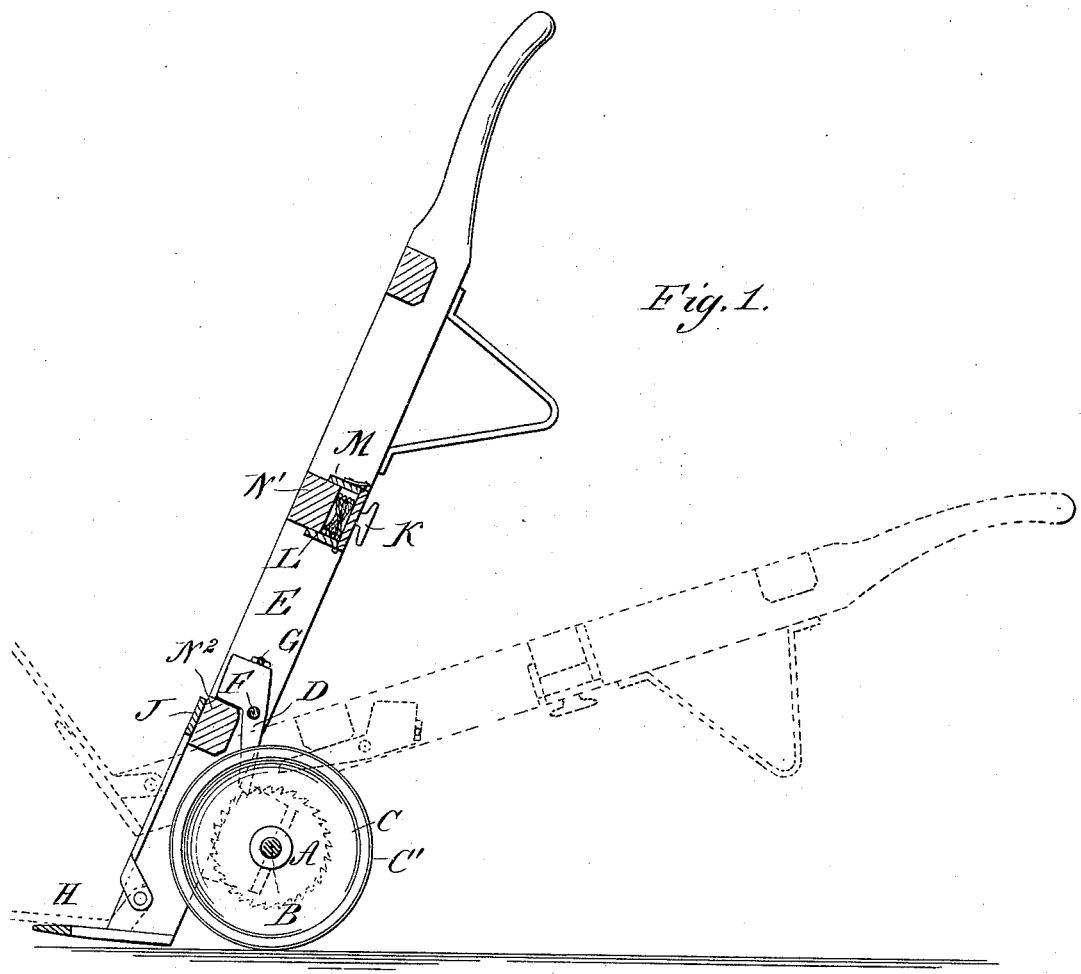
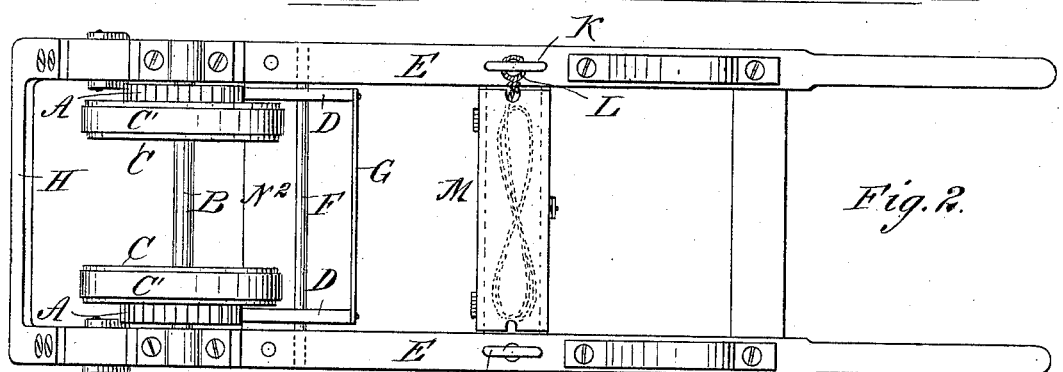
WITNESSES:
Dorr Twitchell.
C. Sedgwick
INVENTOR:
J. H. Strugnell
BY Munn & Co
ATTORNEYS.

UNITED STATES PATENT OFFICE.

JAMES H. STRUGNELL, OF TORONTO, ONTARIO, CANADA.

HAND-TRUCK.

SPECIFICATION forming part of Letters Patent No. 271,152, dated January 23, 1883.

Application filed June 10, 1882. (No model.)

*To all whom it may concern:*

Be it known that I, JAMES H. STRUGNELL, of Toronto, Province of Ontario, Canada, have invented a new and Improved Hand-Truck, of which the following is a full, clear, and exact description.

The invention consists in cleats attached to the under sides of the side bars of the truck, and of a rope or belt contained in a transverse box attached to the truck-frame, which rope or belt is attached to the cleats and is used to hold the load on the truck.

Reference is to be had to the accompanying drawings, forming part of this specification, in which similar letters of reference indicate corresponding parts in both figures.

Figure 1 is a longitudinal sectional elevation of my improved hand-truck, and Fig. 2 is a plan view of the under side of the same.

The ratchet-wheels A are rigidly connected to the truck-wheels C, which are mounted loosely on the axle B, to revolve thereon independently of each other. The wheels C are preferably provided with rubber tires C', as shown. A pawl, D, is pivoted to each side bar, E, of the truck-frame in such a manner that the end can engage with one of the ratchet-wheels A. Preferably both pawls are mounted on the same transverse shaft or rod, F. The ends of the pawls opposite those engaging with the ratchet-wheels are weighted, and are connected by a transverse rod, G, so that both pawls will swing simultaneously. The truck-frame is provided with the usual fixed nose-frame, H, and with an additional longer nose-frame, J, pivoted to the side bars of the truck-frame and adapted to be swung against the fixed nose-frame H, and to project from the truck-frame in the same direction as the nose-frame H, but only a greater distance. This pivoted nose-frame J is only to be used for light loads. A cleat, K, is attached to the under side of each side bar, E, of the truck-frame, and a rope, belt, or thong, L, is contained in a transverse box, M, attached to the under side of one of the cross-bars, N', of the truck-frame, this box being provided with a hinged bottom having a suitable latch or lock for keeping it closed. This strap, rope, or thong can be secured to the cleats K, and can be passed around the load on the truck.

The operation is as follows: When the hand-truck is lowered or but slightly inclined, the weighted ends of the pawls D raise the opposite ends from the ratchet-wheels A, so that the truck can be moved forward and backward freely. The upper edges of the pawls rest against the bottom of the cross-bar $N^2$, and are thus prevented from swinging over completely, as is shown in dotted lines in Fig. 1. If the truck is raised completely, or placed on end to pass the nose-frame under a load—such as a box or barrel—the ends of the pawls D will engage with the ratchet-wheels, lock the same, prevent the wheels C from turning, and will thus prevent the lower or wheel end of the truck from slipping toward the operator, who has both feet disengaged and can obtain a very great leverage.

The above-described device is entirely automatic and requires no adjustment whatever.

Having thus described my invention, I claim as new and desire to secure by Letters Patent—

1. The combination, with a hand-truck, of cleats K, attached to the under sides of the side bars of the truck, substantially as herein shown and described, and for the purpose set forth.

2. The combination, with a hand-truck, of cleats K, attached to the under side of the side bars, and a rope or belt, L, contained in a box on the truck, substantially as herein shown and described, and for the purpose set forth.

JAMES HUDD STRUGNELL.

Witnesses:
THOS. CLARKE MITCHINSON,
H. R. BOTHWELL.